(12) United States Patent
Bush (10) Patent No.: US 6,959,905 B2
(45) Date of Patent: Nov. 1, 2005

(54) PINCH VALVE ELEMENT FOR PLUMBING FIXTURE FLUSH VALVE

(75) Inventor: Shawn D. Bush, 3065 Lowery Dr., Oviedo, FL (US) 32765

(73) Assignee: Shawn D. Bush, Oviedo, FL (US)

( * ) Notice: Subject to any disclaimer, the term of this patent is extended or adjusted under 35 U.S.C. 154(b) by 16 days.

(21) Appl. No.: 10/674,895

(22) Filed: Sep. 29, 2003

(65) Prior Publication Data

US 2005/0067590 A1    Mar. 31, 2005

(51) Int. Cl.$^7$ ............................................. F16K 7/04
(52) U.S. Cl. .............................. 251/40; 251/4; 251/5
(58) Field of Search .............................. 251/4, 5, 7, 9, 251/38, 40, 44, 45

(56) References Cited

U.S. PATENT DOCUMENTS

| | | |
|---|---|---|
| 4,111,391 A | 9/1978 | Pilolla |
| 4,327,891 A | 5/1982 | Allen et al. |
| 4,344,491 A * | 8/1982 | Nolan et al. ................ 175/317 |
| 5,205,325 A * | 4/1993 | Piper ........................... 137/844 |
| 6,299,127 B1 | 10/2001 | Wilson |
| 6,349,921 B1 | 2/2002 | Jahrling |

* cited by examiner

Primary Examiner—Justine R. Yu
Assistant Examiner—Peter deVore
(74) Attorney, Agent, or Firm—The Webb Law Firm (57) ABSTRACT

The present invention discloses a pinch valve for replacing a diaphragm valve in a plumbing fixture. The plumbing fixture includes an inlet chamber defining a fluid inlet and in fluid communication with an inside chamber defining a fluid outlet. The pinch valve includes a cartridge member with a fluid inlet opening, a fluid outlet opening and a cartridge chamber defined by a cartridge chamber wall and in fluid communication with the fluid inlet opening and the fluid outlet opening. A flexible sealing member is positioned at least partially within the cartridge chamber and includes a wall with an inner surface defining an inner chamber and an outer surface defining an outer chamber between the outer surface of the flexible sealing member wall and the cartridge chamber wall. The inlet chamber of the plumbing fixture is in fluid communication with the inner chamber and the outer chamber.

19 Claims, 10 Drawing Sheets

PINCH VALVE ELEMENT FOR PLUMBING FIXTURE FLUSH VALVE

BACKGROUND OF THE INVENTION

1. Field of the Invention

The present invention relates generally to flush valves used in connection with plumbing fixtures, such as toilets, urinals and the like, and in particular, to a replacement for a diaphragm valve in such a plumbing fixture.

2. Description of Related Art

Valves are used throughout many fluid transfer systems and in various applications, such as in the transfer and control of water conduit systems, and in particular in connection with plumbing fixtures in both residential and commercial settings. For example, flush valves are typically used for control and operation of toilets, urinals and the like, such that when a user actuates a handle, water flows through the flush valve into a basin portion and out the drain.

Presently, a common type of flush valve is a diaphragm flush valve. For example, such a diaphragm flush valve is disclosed in U.S. Pat. No. 4,327,891 to Allen et al. The Allen patent discloses the use of a diaphragm in a flush valve, where the diaphragm is made of molded rubber and serves to effectuate the flow of water from a water inlet, through the valve and to a water outlet. Further, the Allen patent sets forth the various components and sub-components of the flush valve according to the prior art.

Such diaphragm flush valves have several drawbacks. For example, the relatively small seal area in the diaphragm can become clogged with debris, which causes the flush valve to remain open, resulting in constant water flow. In addition, since the flush valve is pressurized, a small bleed hole is used in order to allow enough volume to flow through the valve in order to flush the toilet or urinal. This small bleed hole is easily clogged, which can also result in the malfunction of the valve. Still further, the flushing cycle of the diaphragm flush valve takes approximately seven seconds to complete, depending upon the flow rates and water pressure entering the valve, due to the design of the diaphragm of the flush valve. Since an upper chamber fills slowly, the valve is slowly "shutting off". Therefore, a significant amount of water is wasted through the trap and sewer line during the sealing process. The trip lever seal area can also be blocked with debris, which causes the valve to flow continuously. Yet another drawback is that conventional diaphragm flush valves only work at water pressures greater than 35 psi, which is due to the difference in the diaphragm surface area and the diameter of the bleed hole.

Pinch valves have found use in various valve applications other than a diaphragm-type valve. For example, U.S. Pat. No. 4,111,391 to Pilolla discloses a pinch valve including a distortable rubber-like valve member in a generally cylindrical form. As disclosed in the Pilolla patent, the valve member has uniformly spaced projections and grooves enabling it to collapse upon itself and form a complete closure between opposite ends. Heretofore, however, the use of such a pinch valve as a replacement valve in the application of flush valves for plumbing fixtures has not been effective due to the different sealing arrangement bound in pinch valves in comparison to diaphragm valves. Therefore, there remains a need for an effective valve for replacing a diaphragm flush valve in a plumbing fixture.

SUMMARY OF THE INVENTION

It is an object of the present invention to provide a valve replacement for a diaphragm valve that overcomes the deficiencies of the prior art. It is another object of the present invention to provide a valve replacement for a diaphragm valve that has a decreased failure rate and, therefore, an increased cost efficiency. It is a further object of the present invention to provide a valve replacement for a diaphragm valve that has a larger seal area, such that small debris cannot be trapped in the seal area and hold the valve open. It is a still further object of the present invention to provide a valve replacement for a diaphragm valve that has a decreased flush time with a high flow rate and velocity, thereby being more water efficient. It is yet another object of the present invention to provide a valve replacement for a diaphragm valve that is capable of resetting at low pressure, such as when a facility loses mainline pressure.

The present invention is directed to a pinch valve for use in a plumbing fixture, and is particularly adapted for replacement of a diaphragm valve in a plumbing fixture. The plumbing fixture includes an inlet chamber defining a fluid inlet, which is in fluid communication with an internal chamber defining a fluid outlet. The pinch valve includes a cartridge member having a fluid inlet opening, a fluid outlet opening and a cartridge chamber defined by a cartridge chamber wall. The cartridge chamber is in fluid communication with the fluid inlet opening and the fluid outlet opening. A flexible sealing member is positioned at least partially within the cartridge chamber and has a wall with an inner surface defining a flow chamber and an outer surface defining a pressure chamber between the outer surface of the flexible sealing member wall and the cartridge chamber wall. The inlet chamber of the plumbing fixture is in fluid communication with the flow chamber and the pressure chamber.

In an undisturbed state, fluid force in the pressure chamber is at least equal to fluid force in the flow chamber. In this situation, the wall of the flexible member constricts inwardly and pinches, thereby preventing fluid flow through the flow chamber. However, when the pressure chamber is relieved of pressure, the fluid force in the pressure chamber is less than the fluid force in the flow chamber. When this occurs, the wall collapses to an unpinched position, thereby permitting fluid flow through the flow chamber and causing water to flow through the flush valve for flushing of the fixture.

The present invention is also directed to a plumbing fixture. The plumbing fixture includes an inlet chamber defining a fluid inlet in fluid communication with an internal chamber defining a fluid outlet. The plumbing fixture also includes a pinch valve having a cartridge member with a fluid inlet opening, a fluid outlet opening and a cartridge chamber defined by a cartridge chamber wall and in fluid communication with the fluid inlet opening and the fluid outlet opening. The pinch valve further includes a flexible sealing member positioned at least partially within the cartridge chamber and having a wall with an inner surface defining a flow chamber and an outer surface defining a pressure chamber between the outer surface of the flexible sealing member wall and a cartridge chamber wall. The inlet chamber of the plumbing fixture is in fluid communication with the flow chamber and the pressure chamber as described above.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 6A is a cross-sectional view taken along lines 6—6 of FIG. 5 shown in an collapsed unsealed position, while

DESCRIPTION OF THE PREFERRED EMBODIMENTS

Figure 1:
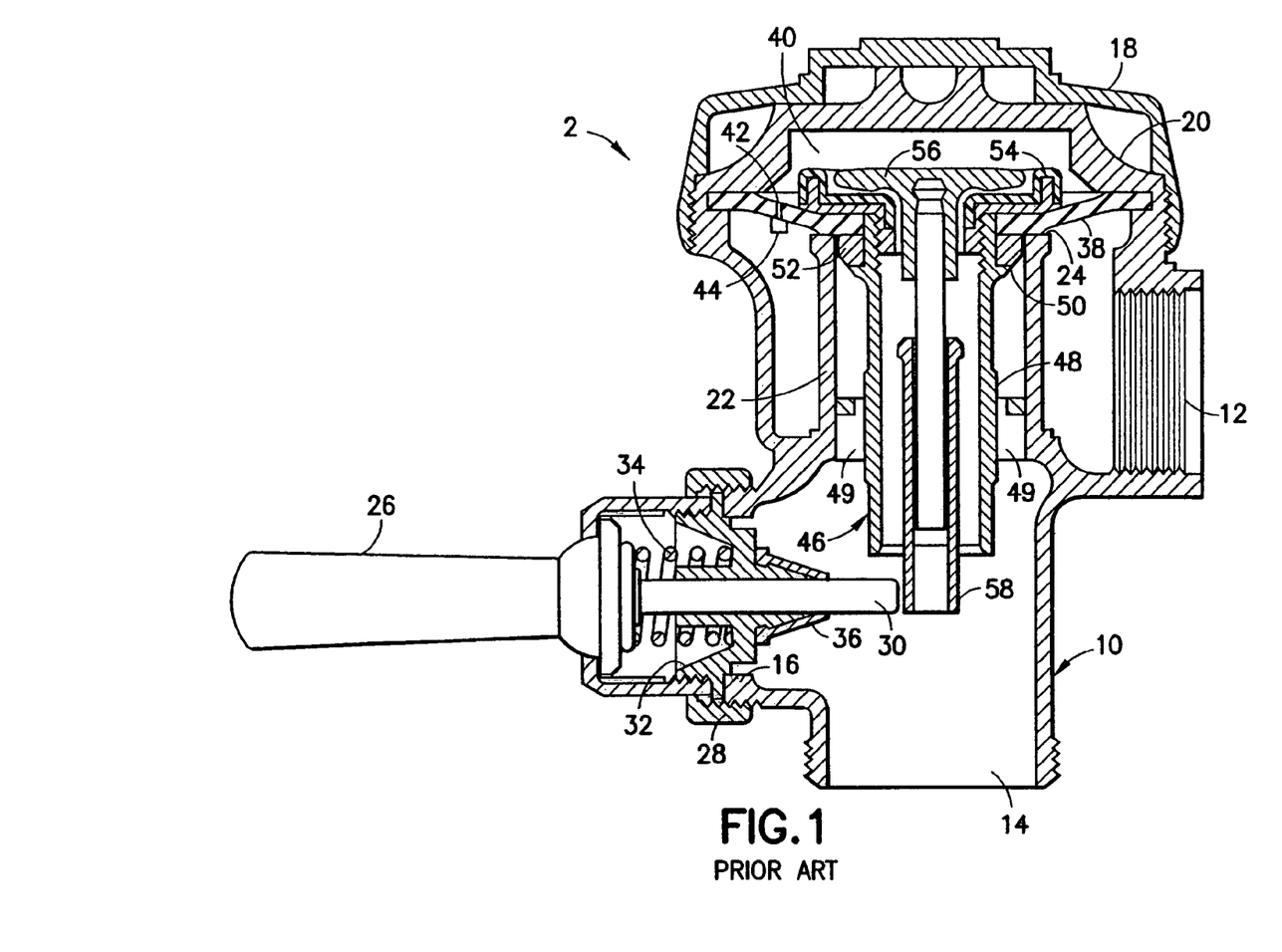
FIG. 1 is a cross-sectional elevational view of a diaphragm flush valve according to the prior art.
Figure 2:
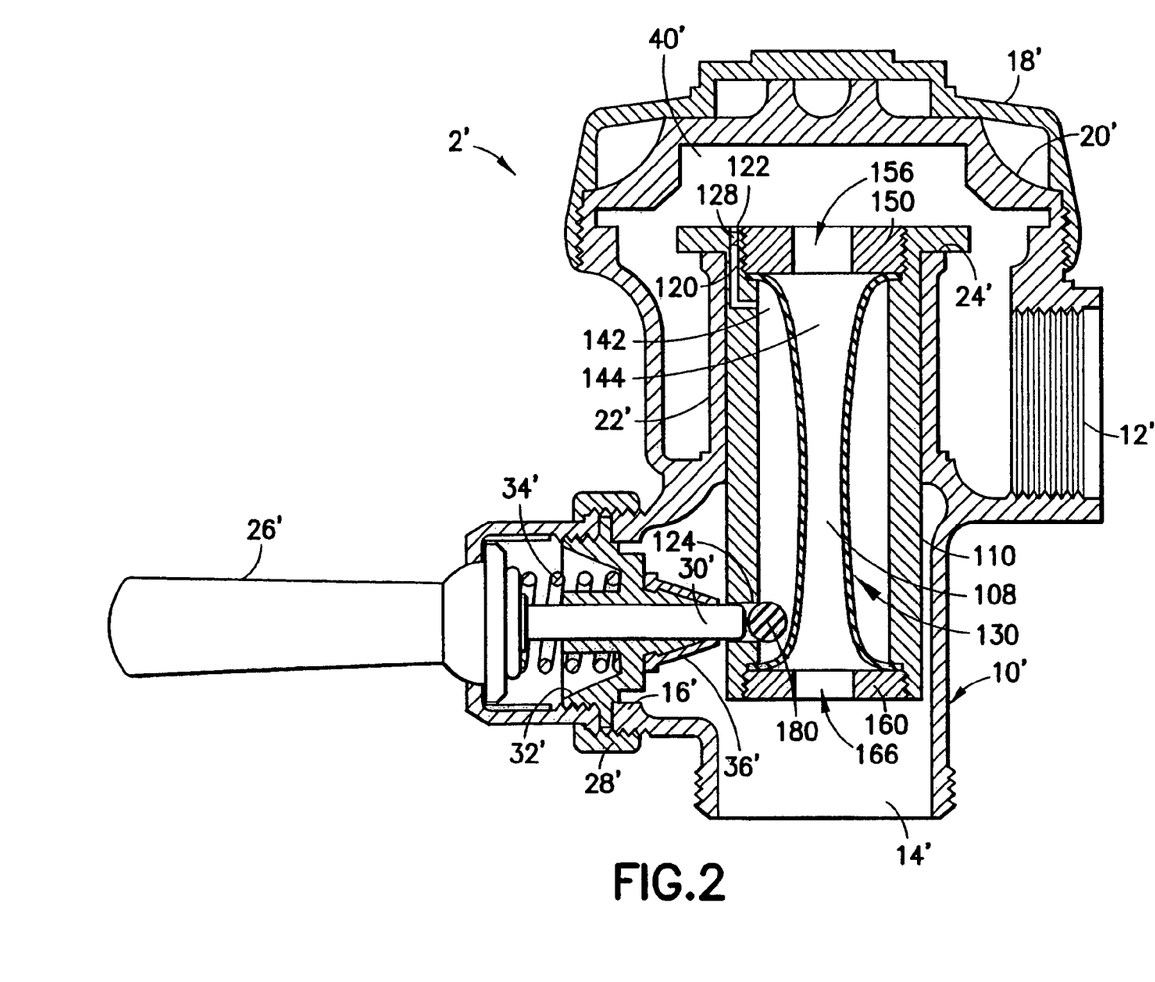
FIG. 2 is a cross-sectional elevational view of a flush valve incorporating a pinch valve element in accordance with the present invention.
Figure 3:
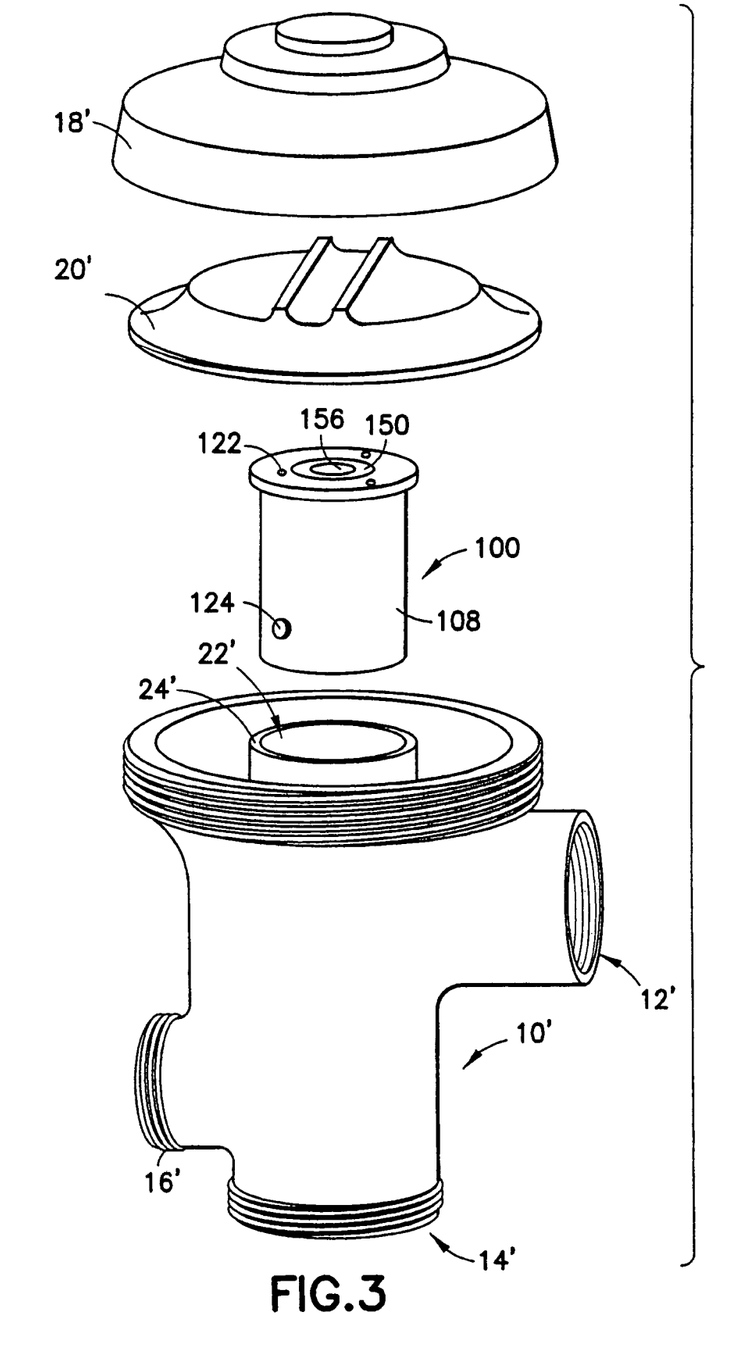
FIG. 3 is an exploded perspective view of the flush valve including the pinch valve element of FIG. 2.

The present invention relates to flush valves, and in particular to an improved valve insert for use in such valves. The valve insert is particularly useful for replacement of a traditional diaphragm-type valve insert for flush valves. Such traditional diaphragm-type valves are shown in U.S. Pat. No. 4,327,891, as depicted in FIG. 1 herein. In such diaphragm-type flush valves, the flush valve 2 has a general hollow body 10 which includes an inlet connection 12, an outlet connection 15 and a handle coupling connection 16. The top of the valve body is closed by an outer cover 18 and an inner cover 20. The inlet portion of the valve is separated from the outlet portion by a central throat 22 which is attached to the inside walls of the valve body 10. A main valve seat 24 is formed on the top of the throat.

The valve is actuated by an operating handle 26 which is fastened to the valve body 10 by means of coupling nut 28. The handle is connected to a plunger 30 which extends to the interior portion of the valve body. The plunger 30 is guided and supported by a bushing 32 and restored by a spring 34. A rubber sealing cap or packing 36 is snapped on the end of bushing 32 and prevents leakage outward from the handle opening.

The annular valve seat 24 is normally closed by a diaphragm 38. The diaphragm extends across the body 10 and defines an upper chamber 40. The diaphragm has a by-pass 42 which provides fluid communication between the inlet side of the valve and the upper chamber 40. A filter 44 may be provided to prevent clogging of the by-pass 42.

The diaphragm 38 is attached at its outer edge to the valve body. The outer cover 18 clamps the diaphragm between a shoulder on the valve body and the inner cover 20. The center of the diaphragm has an opening which allows fluid communication between the upper chamber 40 and the outlet 14. A relief valve shown generally at 46 is attached to the diaphragm and normally closes the opening at the center of the diaphragm. The relief valve 46 includes a guide portion 48 having wings 49. The wings 49 fit closely against the inside diameter of the throat 22. The guide 48 also has a lip 50. The lip supports a collar 52. The relief valve 46 includes a clamping member 54 which is threadedly engaged with the guide portion 48. The clamping member 54 clamps the inner edge of the diaphragm 38 between the member 54 and the collar 52. The clamping member 54 has a hole in the middle which is normally closed by an auxiliary valve member 56. This member is connected to a depending stem 58 which extends to a point opposite the actuating plunger 30. The clamping member 54 may have a rubber liner to improve the sealing contact between the auxiliary valve member 56 and the clamping member.

The operation of this prior art valve is as follows. In the normally-closed position shown in FIG. 1, water pressure at the valve inlet is communicated to the upper chamber 40 through the by-pass 42. Since the surface area subjected to the water pressure is greater on the upper side of the diaphragm, the water pressure forces the diaphragm down onto the valve seat 24. This prevents water from flowing to the outlet 14. When a user rotates the handle 26 in any direction the plunger 30 moves inwardly, tilting the stem 58 and moving the auxiliary valve member 56 out of the sealing engagement with the clamping member 54. This relieves the pressure in the upper chamber 40 by allowing water to flow through the guide member 48. With the upper chamber pressure relieved the inlet water pressure forces the diaphragm upwardly, off of the main valve seat 24. Water then flows directly from the inlet, through the throat 22 and to the outlet 14. When the diaphragm 38 and relief valve 46 move upwardly the auxiliary member 56 reseats, closing off the upper chamber, forcing the diaphragm back onto the main valve seat 24 to close the valve 46. The guide 48 and its associated wings 49 contact the throat 22 to provide stability to the diaphragm as it moves. The guide keeps the diaphragm level as it closes and thus prevents chattering. Should the operating lever 26 be held overly long, the valve 46 will still operate as the stem 58 has a telescoping part which will allow it to return to its normal position even though obstructed by the plunger 30.

As discussed in detail hereinabove, flush valves incorporating such a diaphragm 38 have numerous drawbacks and other deficiencies.

Accordingly, the present invention is directed to a valve element as a replacement for the diaphragm in a conventional valve body. More particularly, with specific reference to FIGS. 2–8, the valve element of the present invention includes a pinch valve replacement element 100 which is provided for use with a conventional flush valve body such as previously described in terms of the prior art including flush valve 2', a hollow body 10', an inlet connection 12', an outlet connection 14', and a handle coupling connection 16'. In the present invention, pinch valve replacement element 100 replaces the diaphragm valve mechanism used in prior art valve bodies, and as such sits directly within hollow body 10' on main valve seat 24' in direct communication with central throat 22', providing a mechanism for regulating water flow through the valve body by way of central throat 22', as will be discussed in more detail herein.

Figure 6A:
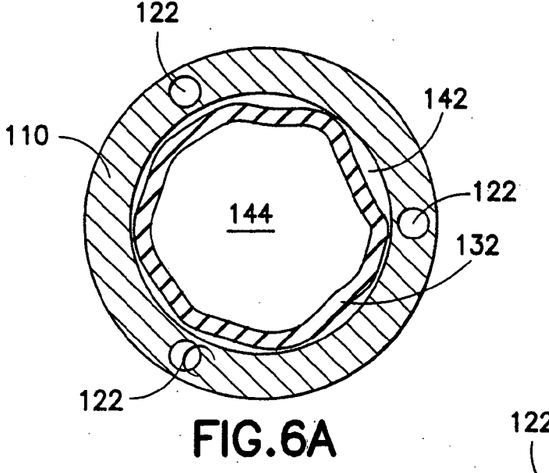
Figure 6B:
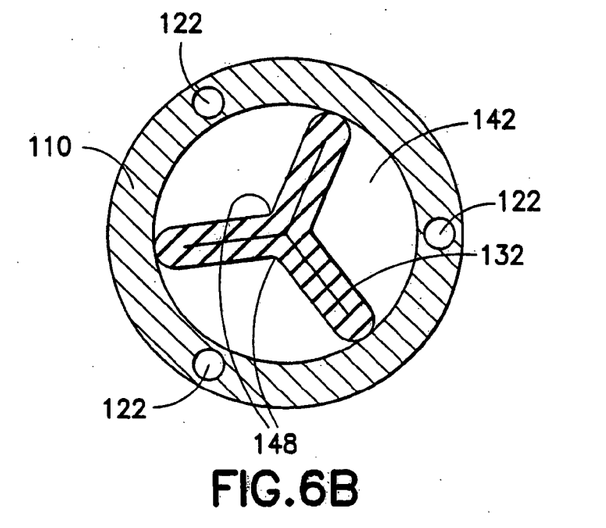
FIG. 6B is a similar cross-sectional view shown in a pinched or constricted sealing position.
Figure 7:
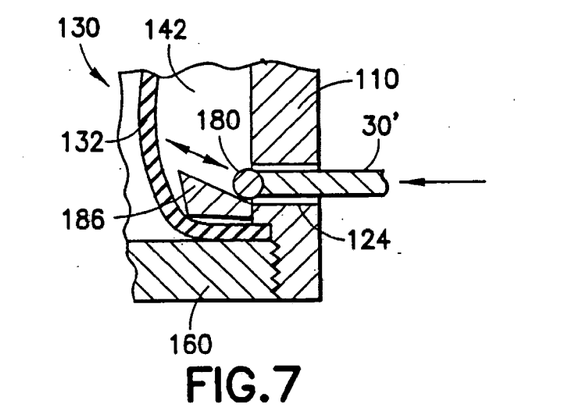
FIG. 7 is a detailed sectional view of a seal portion of the pinch valve element of FIG. 5.

Pinch valve replacement element 100 generally includes a cylindrical cartridge member 102 and a dynamic pinch-type flexible sealing member 130 provided within the cartridge member 102. Cartridge member 102 is defined by a tubular cartridge chamber wall 110 extending between a first open end 102 forming a fluid inlet opening and a second open end 104 forming a fluid outlet opening, and further defining an internal chamber 108 extending therethrough. The internal chamber 108 provides direct fluid communication between the fluid inlet opening defined by first open end 104 and the fluid outlet opening defined by second open end 106. A fluid channel 120 extends through the cartridge chamber wall 110, desirably at a position adjacent first open end 104. Such fluid channel 120 includes a fluid inlet opening 122, which may be present on the top surface of cartridge member 102 adjacent first open end 104 thereof. Desirably, a plurality of fluid channels 120 are provided through the cartridge chamber wall 110 and may be spaced from each other, such as depicted in FIGS. 6A–6B.

The fluid inlet opening preferably has a diameter which is less than the diameter of the fluid inlet established through fluid channel 156 of upper clamping member 150. In use, this fluid channel 120 provides a mechanism for fluid flow from the upper chamber 40' of the valve body into the pinch valve replacement element 100, which fluid flow regulates sealing of the valve for operation of the valve, as will be described in more detail herein. Fluid channel 120 may further be provided with a filter device (not shown) which prevents solid or semi-solid material from flowing through or clogging the fluid channel 120.

The pinch valve replacement element 100 further includes a flexible sealing member 130 positioned within the internal chamber 108 of the cartridge member 102. The flexible sealing member 130 includes a flexible tubular wall 132 extending between a first open end 132 positioned adjacent first open end 104 of cartridge member 102, and a second open end 134 positioned adjacent second open end 106 of cartridge member 102. As such, the flexible sealing member 130 is positioned at least partially within the cartridge member 108, and extends substantially between first open end 104 and second open end 106 of cartridge member 102.

Figure 4:
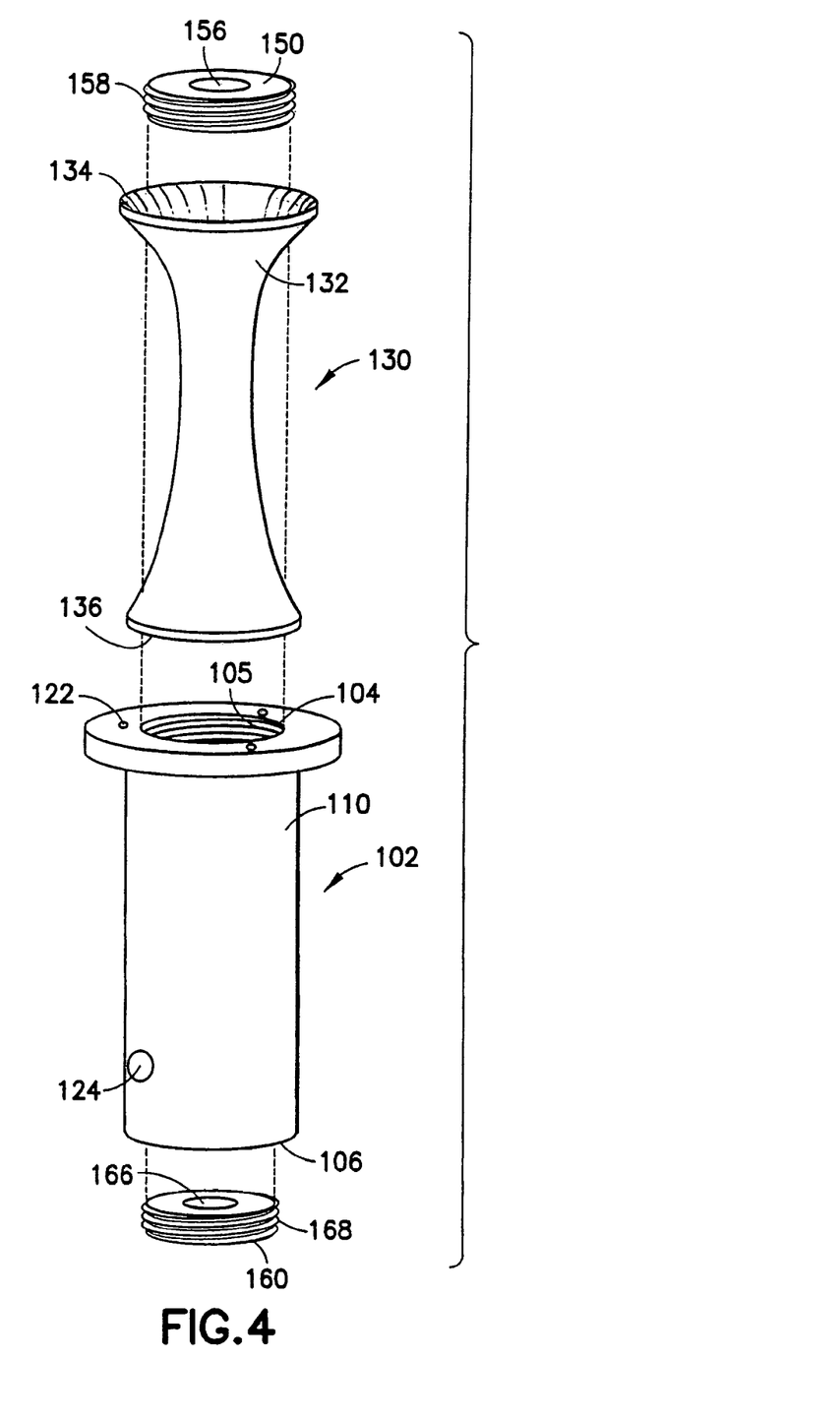
FIG. 4 is an exploded perspective view of the pinch valve replacement element of FIG. 2.
Figure 5:
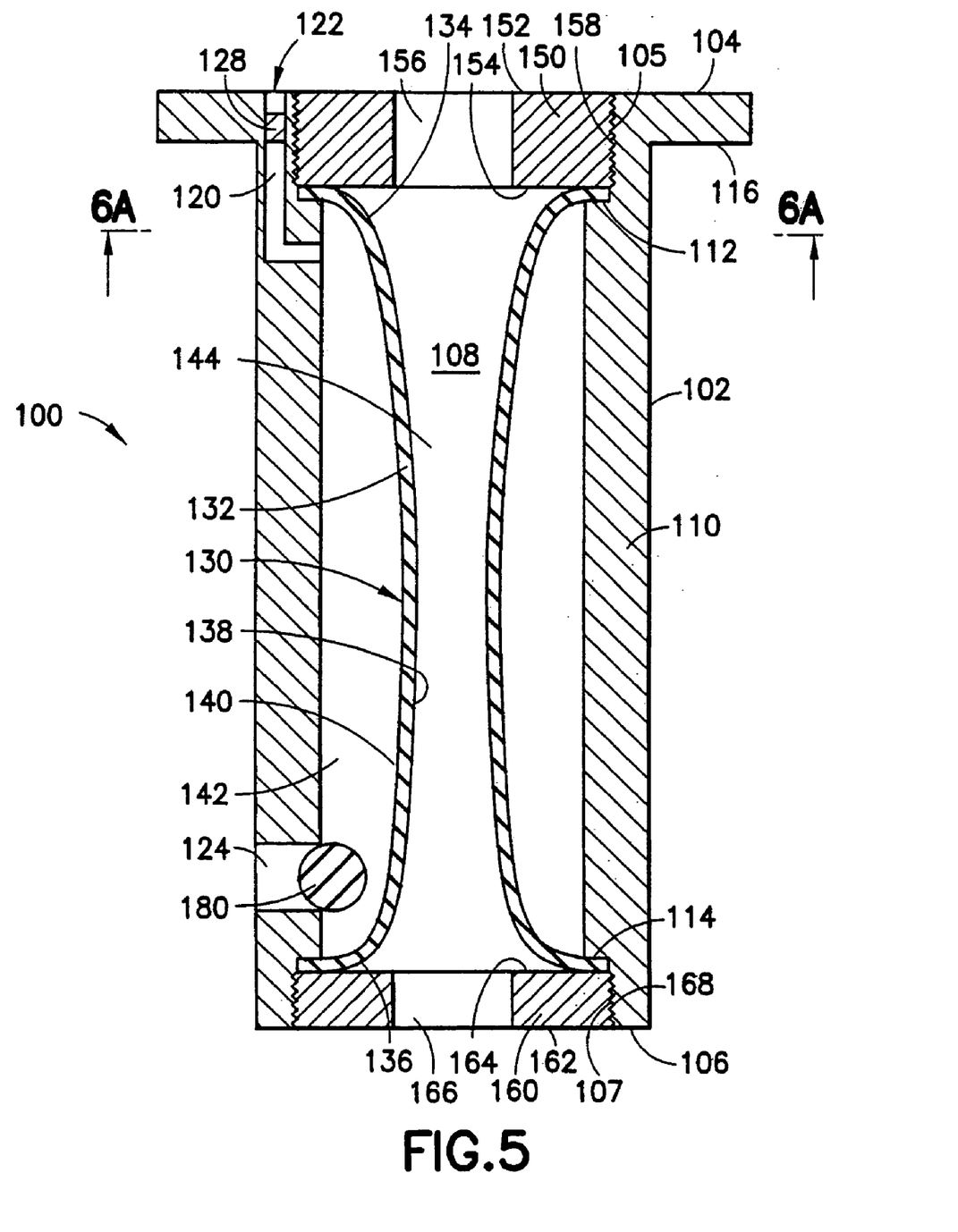
FIG. 5 is a cross-sectional view of the pinch valve replacement element of FIG. 2.

More particularly, the first open end 134 of the flexible sealing member 130 is fixed upon an upper annular rim 112 defined within the first open end 104 of the cartridge member 102. In a similar manner, the second open end 136 of the flexible sealing member 130 is fixed upon a lower annular rim 114 defined within the second open end 106 of the cartridge member 102. Any means of affixing the ends of the flexible sealing member 130 to the ends of the cartridge member 102 may be employed. Desirably, this is accomplished through a mechanical securement, such as through upper clamping member 150 and lower clamping member 160, as best depicted in FIGS. 4 and 5.

Upper clamping member 150 desirably includes a generally disc-shaped cylindrical body extending between an upper, external surface 152 and a lower, internal surface 154, with an internal fluid channel 156 extending therethrough. The outer cylindrical surface of upper clamping member 150 is threaded with external threads 158 for threaded engagement with internal threads 105 which extend within the inner surface of first open end 104 of cartridge member 102. By threading such external threads 158 of upper clamping member 150 with the internal threads 105 of cartridge member 102, the first open end 134 of the flexible sealing member 130 can be effectively trapped between the internal surface 154 of upper clamping member 150 and the upper annular rim 112 of cartridge member 102, thereby effectively securing the entire annular rim of the first open end 134 of flexible sealing member 130 therebetween. In a similar manner, lower clamping member 160 desirably includes a generally disc-shaped cylindrical body extending between a lower, external surface 162 and an upper, internal surface 164, with an internal fluid channel 166 extending therethrough. The outer cylindrical surface of lower clamping member 150 is threaded with external threads 168 for threaded engagement with internal threads 107 which extend within the inner surface of second open end 106 of cartridge member 102. By threading such external threads 168 of lower clamping member 160 with the internal threads 107 of cartridge member 102, the second open end 134 of the flexible sealing member 130 can be effectively trapped between the internal surface 164 of lower clamping member 160 and the lower annular rim 114 of cartridge member 102, thereby effectively securing the entire annular rim of the second open end 136 of flexible sealing member 130 therebetween. As such, both of the ends 134, 136 of the flexible sealing member 130 are statically sealed with respect to cartridge member 102. Cartridge member 102 and upper and lower clamping members 150, 160 may be constructed of any rigid material, for example a metallic material such as stainless steel, or a rigid polymeric material, such as polyethylene terephthalate.

With upper clamping member 150 and lower clamping member 160 secured to opposing ends of cartridge member 102, fluid channel 156 of upper clamping member 150 defines an inlet opening for fluid flow into cartridge chamber 108, and fluid channel 166 of lower clamping member 160 defines an outlet opening for fluid flow out of cartridge chamber 108, as will be discussed in more detail herein.

Moreover, with flexible sealing member 130 secured as such within cartridge member 102, the tubular wall 132 separates cartridge chamber 108 into two separate chambers. In particular, a first chamber is provided as pressure chamber 142, defined between the inner wall surface of cartridge chamber wall 110 and the outer wall surface 140 of tubular wall 132 of flexible sealing member 130. A path for fluid flow between this pressure chamber 142 and the external area of the pinch valve replacement element 100 (namely, upper chamber 40' of the valve body) is provided through the fluid channel 120 which extends through the cartridge chamber wall 110 of cartridge chamber 102 adjacent the first open end 104 thereof. A second chamber is provided as flow chamber 144, defined as the interior chamber within inner wall surface 138 of tubular wall 132 of flexible sealing member 130. The fluid channels 156, 166 of upper clamping members 150, 160 are in fluid communication with this flow chamber 144. As will be discussed in more detail herein, fluid flow through the pinch valve replacement element 100, and therefore fluid flow through the valve body itself, is regulated by the fluid pressure within pressure chamber 142 which regulates the pinching or collapsing of the flexible sealing member 130 to close or open this flow chamber 144, thereby regulating fluid flow between fluid channel 156 and fluid channel 166.

The flexible sealing member 130 is constructed of an elastomeric material, such as rubber, a polymeric material or other synthetic material having elastomeric properties. Further, in order to reduce the chances of failure and reduce the costs of maintenance, a portion or all of the walls of the flexible sealing member 130 may be reinforced with a semi-rigid material. Flexible sealing member 130 is moveable between a collapsed state as shown in FIG. 6A, in which the tubular wall 132 is collapsed, defining flow chamber 144 therein, and a constricted or pinched state as shown in FIG. 6B, in which the tubular wall 132 is pinched or gathered to form a closed structure in which flow chamber 144 is entirely closed off. In particular, flexible sealing member 130 is capable of folding to form a plurality of folded walls which mate with each other and meet together at the center of the pinched sleeve to form a generally complete closure. This folding may be assisted by providing a plurality of grooves 148 on the outer wall surface 140 to act as a weakened portion of tubular wall 132 of flexible sealing member 130. Desirably, three grooves 148 are provided such that flexible sealing member 130 pinches off to form three pairs of mating wall structures which meet at a center point, closing off flow chamber 144. It is contemplated that the inner wall surface 138 of tubular wall 132 may include protrusions at a point corresponding to each of grooves 148 such that, upon pinching off, the protrusions meet at a center point to ensure complete closing of flow chamber 144.

Pinch valve replacement element 100 is positioned within the hollow body 10' of the flush valve 2', and in particular, within central throat 22'. The cylindrical shape of the cartridge member 102 is dimensioned such that cartridge chamber wall 110 has an outer diameter which is substantially the same size, or only slightly smaller than, the internal diameter of central throat 22', such that a snug fit is achieved with little or no annular space therebetween. The cartridge member 102 may also include a rim portion 116 with a rim portion undersurface 118. The rim portion undersurface 118 is sized and shaped so as to engage with and form a seal with the upper edge defining the main valve seat 24' of the central throat 22' of the plumbing fixture. For example, the undersurface 118 of the rim portion 116 may include a layer capable of forming a seal, desirably an elastomeric layer or other layer such as a coated layer, a bonded layer, or other similar seal area.

Cartridge member 102 further includes a plunger channel 124 extending through the cartridge chamber wall 110 at a location between the upper annular rim 112 within first open end 104 and the lower annular rim 114 within second open end 106. In this manner, plunger channel 124 establishes a path for fluid flow between pressure chamber 142 and the external environment, namely outlet connection 14', through the cartridge wall 110. When pinch valve replacement element 100 is positioned within central throat 22' of the flush valve body, the lower end of the cartridge member 102 adjacent second open end 106 must be properly positioned such that the plunger channel 124 is aligned with plunger 30', which is interconnected with operating handle 26' and extends through hollow body 10' through coupling nut 28', bushing 32', spring 34' and packing 36' as described above in connection with FIG. 1 with reference to the prior art. Desirably, plunger 30' may be positioned so as to extend slightly within plunger channel 124, which extends through cartridge chamber wall 110. As such, plunger channel 124 is desirably larger in diameter than plunger 30' to provide sliding movement of plunger 30' therein and to permit fluid to flow around plunger 30' through plunger channel 124.

Moreover, plunger channel 124 includes a sealing member, and preferably a spherical sealing member such as ball seal 180, for closing fluid channel 120 to prevent fluid flow therethrough. Desirably, such a sealing member is a ball seal 180 positioned within pressure chamber 142 and adapted to seal against the inner surface of the cartridge chamber wall 110 at the interior opening forming plunger channel 124, as shown in FIG. 5. This sealing member may be constructed of any material capable of sealing fluid channel 120 for fluid flow, and is desirably an elastomeric material such as rubber. It is also contemplated that plunger 30' may be provided with an enlarged end surface to act as such a sealing member. Also, in embodiments wherein pinch valve replacement element 100 is provided as an integral unit for replacement of a diaphragm-type valve element for retrofitting an existing flush valve, a separate extension piece can be provided for attachment to the end of plunger 30' so as to extend within plunger channel 124 and seal off the opening and prevent fluid flow therethrough.

Assembly of flush valve 2' including pinch valve replacement element 100 is as follows. Flush valve 2' is provided with hollow body 10', and may be appropriately connected to a water source through inlet connection 12', and to a plumbing fixture such as a toilet, a urinal, or the like, through outlet connection 14'. Also, operating handle 26', as well as the corresponding plunger 30', bushing 32', spring 34' and packing 36' components, may be connected to handle coupling connection 16' through coupling nut 28'. Pinch valve replacement element 100 is provided within central throat 22', with rim portion 116 resting on main valve seat 24' in a sealing engagement. Pinch valve replacement element 100 is positioned such that plunger channel 124 is aligned with plunger 30', and desirably, such that plunger 30' slightly extends within plunger channel 124. Inner cover 20', if provided, may then be placed over flush valve 2', with outer cover 18' thereafter threaded onto hollow body 10' to enclose flush valve 2'. In this manner, pinch valve replacement element 100 provides a valve element for regulating fluid flow, in particular water flow, between inlet connection 12' and outlet connection 14'.

As noted, the present invention is directed to a flush valve including the pinch valve element therein, as well as to the pinch valve element for use as a replacement or retrofit for a diaphragm-type valve. Accordingly, in use as a replacement or retrofit application, assembly of the flush valve 2' may first involve removing the outer and inner covers, and removing a diaphragm-type valve, such as the diaphragm 38 and all corresponding parts described in connection with the prior art with reference to FIG. 1. After removal of such diaphragm parts, the pinch valve replacement element 100 can be placed within the central throat 22' of hollow body 10' as described above, with plunger 30' aligned with plunger channel 124, and with the inner and outer covers 20', 18' replaced onto hollow body 10'.

In operation, flush valve 2' including pinch valve replacement element 100 therein is connected to an appropriate source of water through inlet connection 12' and to an appropriate fixture through outlet connection 14'. Pinch valve replacement element 100 is sealed off because flexible sealing member 130 is pinched. This is achieved by the fluid force in the pressure chamber 142 being at least equal to the fluid force in the flow chamber 144. In particular, water flows into upper chamber 40' of flush valve 2' from inlet connection 12', and passes into fluid inlet opening 122 and through fluid channel 120 into pressure chamber 142. When sufficient water is present within pressure chamber 142, the flexible tubular wall 132 of flexible sealing member 130 pinches and/or folds along grooves 148, closing off flow chamber 144 and forming a closed structure as seen in FIG. 6B. In this state, the tubular wall 132 of the flexible sealing member 130 folds inwardly and pinches the inner wall surface 138 of the flexible sealing member 138 against itself. Accordingly, this prevents fluid flow through the flow chamber 144.

To operate the valve, i.e., to provide water to the fixture, water flow must be established through cartridge chamber 108, which is dynamically sealed off through flexible sealing member 138 as described above. Accordingly, the pressure which forces flexible sealing member 138 pinched closed must be relieved. This is achieved by activation of the operating handle 26' of the flush valve 2'. More particularly, rotational movement of operating handle 26' in any direction causes the plunger 30' to moves inwardly. Such movement causes the end of plunger 30' to pass through plunger channel 124 and to contact and displace ball seal 180 from sealing engagement with plunger channel 124. As such, water flows from within the pressure chamber 142 through the plunger channel 124 and out through outlet connection 14' to the plumbing fixture connected thereto. This outflow of water from within the pressure chamber 142 relieves the pressure within the pressure chamber 142, which reduces the fluid force in the pressure chamber 142 to less than the fluid force in the flow chamber 144. With this reduction in pressure, tubular wall 132 of the flexible sealing member 130 relaxes or collapses to an unpinched position, thereby permitting fluid flow through the flow chamber 144. As such, water is then free to flow directly from the inlet 12', through upper chamber 40', and down through the cartridge chamber 108, more particularly down through fluid channel 156, through flow chamber 144, out through fluid channel 166 and to the outlet 14' for delivery to the associated plumbing fixture.

Plunger channel 124 cannot remain permanently open or sufficient pressure cannot build in the pressure chamber 142. Accordingly, during this water flow through flush valve 2', sufficient water passes through the flush valve 2' through cartridge chamber 108 to flush the fixture, while water is simultaneously passing through fluid inlet opening 122 and through fluid channel 120 into pressure chamber 142. This flow of water into pressure chamber 142 gradually increases the fluid pressure within pressure chamber 142, and causes, the sealing member, which is provided for example through ball seal 180, to re-engage and re-seal the opening to plunger channel 124 to prevent any further fluid flow therethrough. When the plunger channel 124 is sealed by the ball seal 180 as such, fluid can collect in the pressure chamber 142 at a more rapid pace. As such, the fluid force within pressure chamber 142 increases to a level at which it is greater than the fluid force within flow chamber 144. At this point, tubular wall 132 of flexible sealing member 130 once again constricts or pinches, thereby closing off flow chamber 144 from further fluid flow therethrough.

As noted, when the seal between the ball seal 180 and the plunger channel 124 is disengaged or broken, the ball seal 180 must be re-engaged with the plunger channel 124 in order to stop the fixture from running continuously. There are several manners of accomplishing this result. For example, a sloped surface 186 may be provided immediately adjacent and be sloped toward the inner wall opening at plunger channel 124. In this manner, when the plunger 30' pushes and disengages the ball seal 180, and after the fluid is finished exiting through the plunger channel 124, the ball seal 180 slides or rolls back down the sloped surface 186 and to re-engage with the opening at plunger channel 124.

As indicated, pinch valve replacement element 100 can be provided as an integral unit with flexible sealing member 130 secured within cartridge member 102 as described. In this manner, the pinch valve replacement member 100 can be easily inserted into the central throat 22' of hollow body 10 of a flush valve body, and serves as an easy replacement for a removed diaphragm valve element. Accordingly, the present invention is directed not only to a pinch valve as described hereinabove, but also to a plumbing fixture, such as a flush valve assembly, which includes such a pinch valve in combination with a flush valve assembly.

Figure 8:
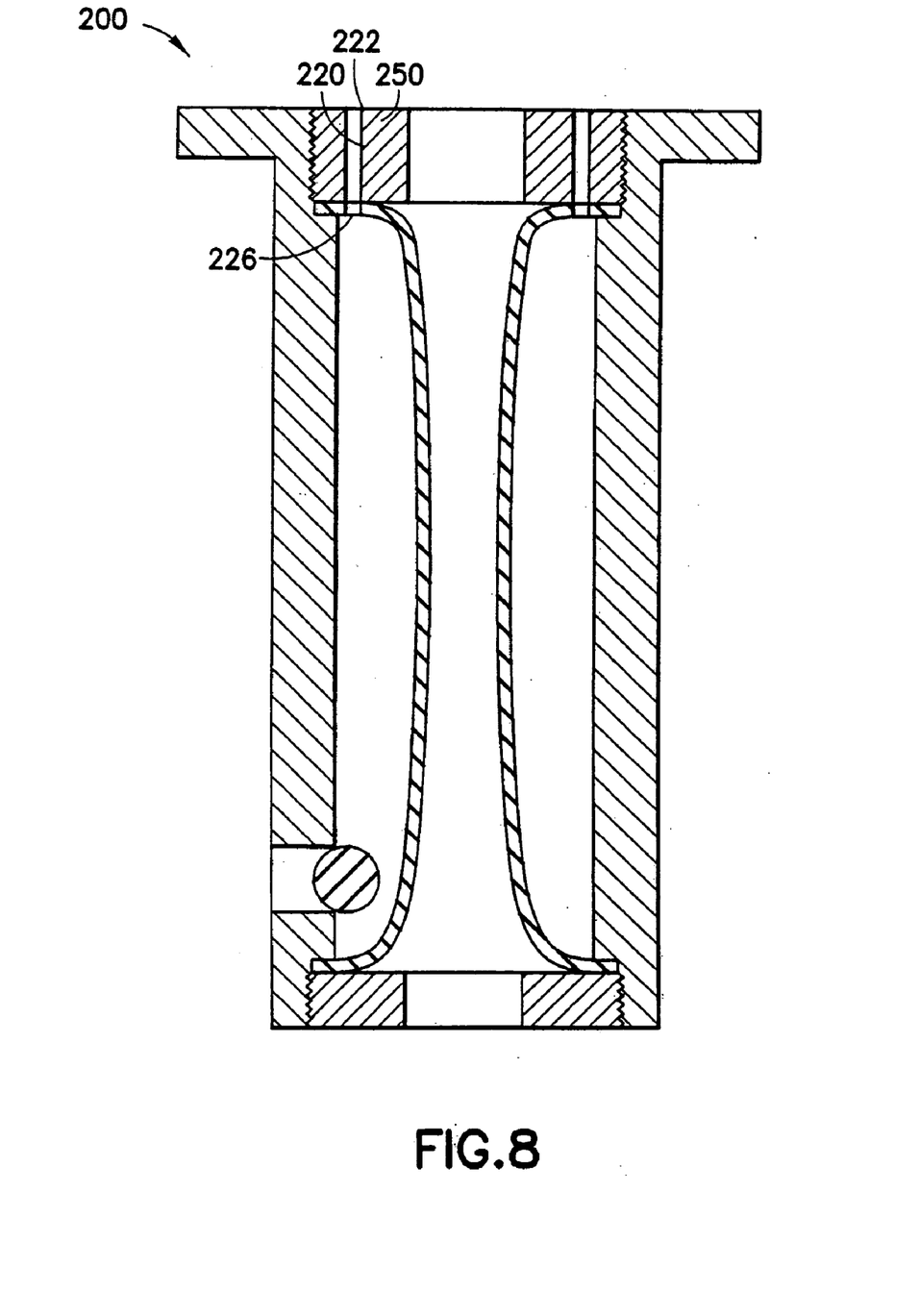
FIG. 8 is a side cross-sectional view of a pinch valve replacement element shown in an alternative embodiment.

FIG. 8 depicts a pinch valve replacement element 200 in a further embodiment of the present invention. In particular, in the embodiment depicted in FIG. 8, the cartridge member is substantially identical to the previously described embodiment, with the exception that the fluid channel does not extend through the cartridge chamber wall. Instead, in the present embodiment, a different type of upper clamping member 250 is provided for securing the flexible sealing member within the cartridge member, which upper clamping member 250 includes a fluid channel 220 including a fluid inlet opening 222. Also, the flexible sealing member includes a bleed hole 226 extending through the wall thereof at a position adjacent and aligned with the fluid channel 220. The pinch valve replacement element 200 works in a similar manner as in the previous embodiment, except that in order for the flexible sealing member to constrict and pinch the valve closed, water enters into the pressure chamber through the upper clamping member 250 as opposed to through the cartridge chamber wall of the cartridge chamber, that is, through the fluid inlet opening 222, through the fluid channel 220, and through the bleed hole 226, as shown in FIG. 8. It is noted that a plurality of fluid channels 220 may be provided through the upper clamping member, and may be properly spaced thereabout.

Figure 9:
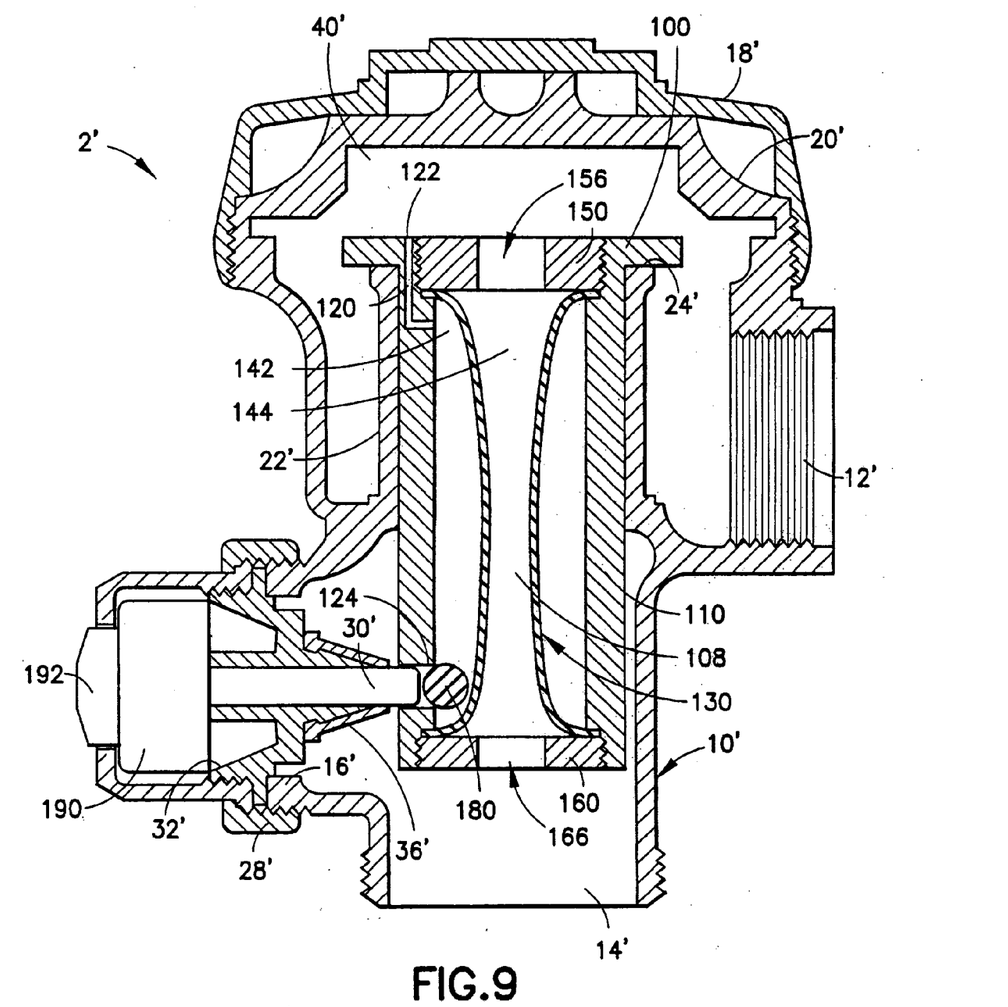
FIG. 9 is a cross-sectional view of a flush valve incorporating a pinch valve element in a further embodiment of the present invention showing an alternative activation mechanism.

FIG. 9 depicts a further embodiment of the present invention, in which the mechanical activation mechanism for the flush valve is substituted or replaced with an electronic activation mechanism, such as a solenoid mechanism. In particular, in the embodiment of FIG. 9, the flush valve 2' including the pinch valve replacement element 100 is identical to the embodiment described in connection with FIGS. 1–7, but substituting the previously described operating handle with a solenoid assembly 190. Solenoid assembly 190 may be any assembly capable of providing a linear movement upon activation, as is known in the art. Upon activation, solenoid assembly 190 causes a linear movement of plunger 30', which in turn causes activation of the pinch valve assembly for water flow through the flush valve for flushing of the fixture, as previously described. Activation of the solenoid assembly may be accomplished in any known manner, such as through contact with a push button 192 which activates the solenoid assembly 190. Alternatively, an electronic sensor assembly (not shown) may be associated with solenoid assembly 190 to cause automatic activation thereof, as is known in the art.

Figure 10:
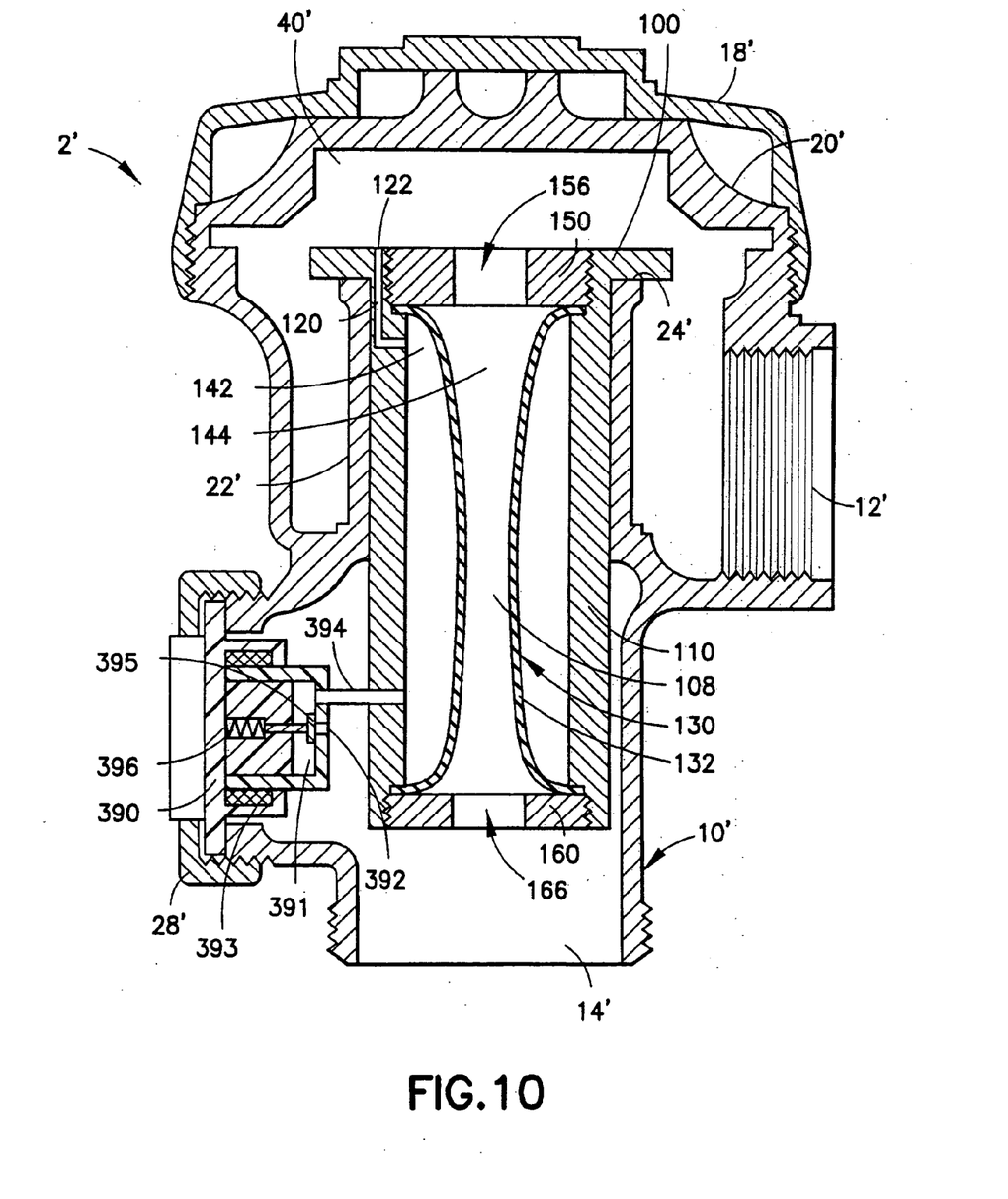
FIG. 10 is a cross-sectional view of a flush valve incorporating a pinch valve element in yet a further embodiment of the present invention showing a pressurizing unit for valve control.

FIG. 10 depicts a further variation on the embodiment of FIG. 9, with the solenoid element acting as a flow regulator as opposed to merely providing a linear actuator for activation of a plunger element. More particularly, as with the embodiment of FIG. 9, the flush valve 2' including the pinch valve replacement element 100 is identical to the embodiment described in connection with FIGS. 1–7, but substituting the previously described operating handle with a solenoid assembly 390 and eliminating the need for a ball seal. Instead, sealing of the pressure chamber 142 is achieved through water flow through the solenoid assembly 390.

For example, the solenoid assembly 390 may be interconnected to the pinch valve replacement element 100 through a flow channel 394 extending through the cartridge wall 110, thereby establishing fluid communication between pressure chamber 142 and the solenoid assembly 390. Solenoid assembly 390 includes a housing which defines an interior flow chamber 391 therein, with a flow port 392 extending through the housing and providing a path for fluid communication between the interior flow chamber 391 and outlet 14', and with flow channel 394 in fluid communication with interior flow chamber 391. Solenoid assembly 390 further includes a solenoid coil 393 which surrounds a plunger 395 biased by spring 396 to the right, as illustrated in the drawings, or toward a position closing the flow port 392. The solenoid assembly 390 is attached to the valve body 10' through a coupling nut 28', and is interconnected with pinch valve replacement element 100 through a tubing such as flow channel 394. Solenoid assembly 390 may further be interconnected with an electronic sensor element for activation thereof.

In operation, the plunger 395 is biased through spring 396 to a position closing and sealing flow port 392. In this position, a sealed environment is established such that pressure chamber 142 can fill with water as described previously, thereby constricting flexible wall 132 of flexible sealing member 130 and closing or pinching off the flow chamber 144. When the solenoid assembly 390 is activated, such as through an infrared sensor (not shown), electric power is applied to the solenoid coil 393, causing the plunger 395 to move away from flow port 392. Water which is contained within pressure chamber 142 is then released and can then flow through flow channel 394 into interior flow chamber 391 and out through flow port 392 where it is released into outlet 14'. This releases the pressure within pressure chamber 142 which in turn causes the flexible wall 132 of flexible sealing member 130 to collapse, thereby opening flow chamber 144 and permitting water flow therethrough.

After the solenoid assembly 390 has been activated for a predetermined time period, such as five seconds, the electric power to the solenoid coil 393 is cut off, and the spring 396 with again bias plunger 395 against flow port 392, thereby closing it off and sealing off interior flow chamber 391. Pressure can then accumulate therein, and water will again flow through fluid inlet opening 122 and fluid channel 120 into pressure chamber 142, and will once again pinch off flow chamber 144 when sufficient pressure is established to constrict flexible wall 132.

Figure 11:
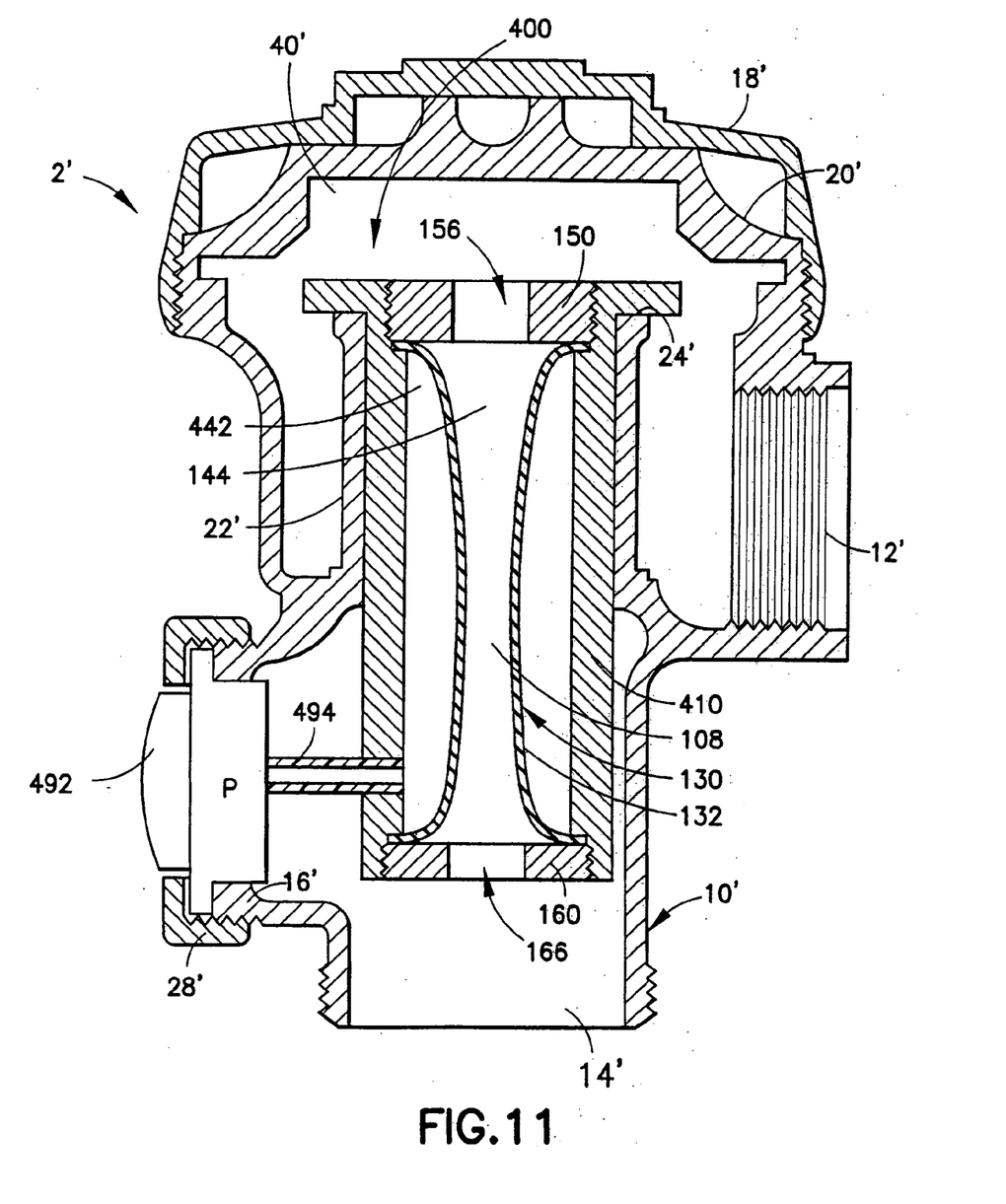
FIG. 11 is a cross-sectional view of a flush-valve incorporating a pinch valve element in yet a further embodiment of the present invention incorporating an external pressurizing source.

FIG. 11 depicts yet a further embodiment of the present invention, in which the pinch valve replacement element 400 includes a pressure chamber 442 which is designed to be pressurized through an external air source as opposed to water flowing through the flush valve. More particularly, the activation mechanism of the previously described embodiment of FIG. 1–7 is replaced with an activation mechanism including a pressure source P. Cartridge wall 410 does not include any fluid channel extending therethrough, nor any plunger channel extending therethrough. Instead, an air channel 494 extends from pressure source P through the cartridge wall 410 and into pressure chamber 442. Pressurized air can therefore be provided from pressure source P through air channel 494 and into pressure chamber 442. When the air pressure within pressure chamber 442 is sufficient, flexible wall 132 of flexible sealing member 130 constricts to pinch off the flow chamber 144. To activate the valve, an activation mechanism, such as push button 492, causes the pressure source P to release the air pressure provided within pressure chamber 442, such as through an air bleed hole (not shown). This causes a decrease in the air pressure within pressure chamber 442, and once the pressure falls below a predetermined threshold, the water pressure acting upon the flexible wall of flexible sealing member 130 will overcome the air pressure and collapse flexible wall 132, thereby opening flow chamber 144 for water flow therethrough. After a predetermined period of time, pressure source P will once again provide air pressure through air channel 494 to re-pressurize pressure chamber 442, which in turn will cause the flexible wall 132 of flexible sealing member 130 to constrict and again pinch off flow chamber 144, stopping the flow of water therethrough. In such an embodiment, it is important to ensure that pressure source P, as well as air channel 494 and pressure chamber 442, are appropriately sealed from both the external environment as well as to the internal water flow within the valve assembly, so as to be able to maintain proper pressure regulation therein and prevent water from entering the pressure source P.

The present invention provides a more durable flush valve requiring less maintenance through the use of the pinch valve element as opposed to a standard conventional diaphragm-type valve. Due to the large seal area established by the wall 132 of the flexible sealing member 130 closing in on itself, even if debris is trapped or engaged in the pinched area, a seal is still realized. Also, the large diameter secondary fluid inlet opening established by fluid channel 156 is not easily clogged. In addition, the present invention provides a valve element that has a single static seal area as opposed to multiple sealing areas as in the diaphragm valve 12 according to the prior art.

The pinch valve replacement element 100 of the present invention is capable of achieving flush flow-through times of about 3.5 seconds with a very high flow rate velocity when used in connection with a standard flush valve. Moreover, the pinch valve element is capable of being reset at very low fluid pressures, and therefore can reseal itself and close off water flow even when a facility loses mainline pressure.

This invention has been described with reference to the preferred embodiments. Various modifications and alterations will be apparent upon reading and understanding the preceding detailed description. It is intended that the invention be construed as including all such modifications and alterations.

The invention claimed is:

1. A pinch valve for regulating fluid flow through a flush valve extending between a fluid inlet in fluid communication with a source of fluid and a fluid outlet in fluid communication with a plumbing fixture, the pinch valve comprising:
   a cartridge member having a cartridge chamber wall extending between a fluid inlet opening and a fluid outlet opening and defining a cartridge chamber therebetween;
   a flexible sealing member positioned at least partially within the cartridge chamber and having a flexible wall with an inner surface defining a flow chamber extending between the fluid inlet opening and the fluid outlet opening of the cartridge member, and an outer surface defining a pressure chamber between the outer surface of the flexible wall and the cartridge chamber wall, wherein the flexible wall is adapted to constrict upon itself when a fluid force in the pressure chamber is at least equal to the fluid force in the flow chamber to close the flow chamber and prevent fluid flow therethrough;
   wherein the fluid inlet in connection with the source of fluid is in fluid communication with the flow chamber and the pressure chamber of the pinch valve;
   wherein the cartridge member further comprises at least one fluid outlet channel extending therethrough for fluid flow out of the pressure chamber;

wherein the fluid outlet channel includes a sealing member for sealing engagement to prevent fluid flow out of the pressure chamber; and wherein the plumbing fixture includes an actuation mechanism in operative communication with the pressure chamber, such that actuation of the actuation mechanism relieves the pressure chamber of pressure, reducing the fluid force in the pressure chamber to less than the fluid force in the flow chamber, such that the flexible wall of the flexible sealing member collapses, thereby permitting fluid flow through the flow chamber.

2. The pinch valve of claim 1, wherein when the pressure chamber is relieved of pressure, the fluid force in the pressure chamber is less than the fluid force in the flow chamber, such that the flexible wall collapses, thereby permitting fluid flow through the flow chamber.

3. The pinch valve of claim 1, wherein the cartridge member includes at least one fluid inlet channel extending therethrough for fluid flow into the pressure chamber.

4. The pinch valve of claim 3, wherein the fluid inlet channel is a bleed opening having a diameter less than the diameter of the fluid inlet opening of the cartridge member.

5. The pinch valve of claim 4, further comprising a filter in operative communication with the fluid inlet channel.

6. The pinch valve of claim 1, wherein the actuation mechanism includes a plunger in operative communication with the fluid outlet channel such that when the actuation mechanism is actuated, the plunger causes the sealing member to displace from sealing engagement with the fluid outlet channel to permit fluid flow out of the pressure chamber.

7. The pinch valve of claim 6, wherein the actuation mechanism further includes a handle element extending externally from the plumbing fixture and the plunger extends internally within the plumbing fixture and is in operative communication with the handle element, such that, when the handle element is actuated, the plunger is correspondingly actuated to displace the sealing member.

8. The pinch valve of claim 7, wherein the sealing member is a substantially spherical member configured to sealingly engage a corresponding opening in the fluid outlet channel.

9. The pinch valve of claim 8, wherein the sealing member is constructed from an elastomeric material.

10. The pinch valve of claim 1, wherein the cartridge member includes a rim portion having an undersurface configured to engage with an upper edge of an inside chamber of the plumbing fixture.

11. The pinch valve of claim 1, wherein the flow chamber is in fluid communication with a basin.

12. The pinch valve of claim 1, wherein the plumbing fixture is one of a toilet and a urinal.

13. The pinch valve of claim 1, wherein the flexible sealing member comprises an elastomeric material.

14. The pinch valve of claim 1, wherein the flexible sealing member is attached to the cartridge member through an attachment mechanism.

15. The pinch valve of claim 14, wherein the cartridge chamber is further defined by an upper annular rim adjacent the fluid inlet opening and a lower annular rim adjacent the fluid outlet opening, wherein the cartridge member further comprises an upper clamping member including a fluid channel extending therethrough and in fluid communication with the fluid inlet opening of the of the cartridge chamber, the upper clamping member configured to engage the cartridge chamber wall and abut the upper annular rim, and wherein the cartridge member further comprises a lower clamping member including a fluid channel extending therethrough and in fluid communication with the fluid outlet opening of the cartridge chamber, the lower clamping member configured to engage the cartridge chamber wall and abut the lower annular rim.

16. The pinch valve of claim 15, wherein at least a portion of a first end of the flexible sealing member is clamped between the upper clamping member and the upper annular rim and at least a portion of a second end of the flexible sealing member is removably clamped between the lower clamping member and the lower annular rim, thereby securely positioning the flexible sealing member within the cartridge chamber.

17. The pinch valve of claim 15, wherein the upper clamping member and the lower clamping member are threadedly engaged with corresponding threaded portions of the cartridge chamber wall.

18. A method of retrofitting a flush valve in a plumbing fixture comprising:
   a) providing a flush valve comprising an inlet chamber in fluid communication with a fluid source and an outlet chamber in fluid communication with a plumbing fixture; and
   b) inserting a pinch valve between the inlet chamber and the outlet chamber, said pinch valve adapted for regulating fluid flow between the inlet chamber and the outlet chamber and comprising a cartridge member having a cartridge chamber wall extending between a fluid inlet opening in fluid communication with the inlet chamber and a fluid outlet opening in fluid communication with the outlet chamber, the cartridge chamber wall defining a cartridge chamber therebetween, and a flexible sealing member positioned at least partially within the cartridge chamber and extending between the fluid inlet opening and the fluid outlet opening of the cartridge member, the flexible sealing member having a flexible wall with an inner surface defining a flow chamber extending between the fluid inlet opening and the fluid outlet opening of the cartridge member, and an outer surface defining a pressure chamber between the outer surface of the flexible wall and the cartridge chamber wall, wherein the flexible wall is adapted to constrict upon itself when a fluid force in the pressure chamber is at least equal to the fluid force in the flow chamber to close the flow chamber and prevent fluid flow between the inlet chamber and the outlet chamber, wherein the cartridge member includes at least one fluid outlet channel extending out of the pressure chamber with a sealing member for sealing engagement to prevent fluid flow out of the pressure chamber, and wherein the method further comprises aligning the fluid outlet chamber with an activation member of the flush valve such that the activation member is adapted for engagement with the sealing member upon activation thereof.

19. A method of retrofitting a flush valve in a plumbing fixture comprising:
   a) providing a flush valve comprising an inlet chamber in fluid communication with a fluid source and an outlet chamber in fluid communication with a plumbing fixture;
   b) removing a diaphragm valve from the flush valve; and
   c) inserting a pinch valve between the inlet chamber and the outlet chamber, said pinch valve adapted for regulating fluid flow between the inlet chamber and the outlet chamber and comprising a cartridge member having a cartridge chamber wall extending between a fluid inlet opening in fluid communication with the inlet chamber and a fluid outlet opening in fluid communication with the outlet chamber, the cartridge chamber wall defining a cartridge chamber therebetween, and a flexible sealing member positioned at least partially within the cartridge chamber and extending between the fluid inlet opening and the fluid outlet opening of the cartridge member, the flexible sealing member having a flexible wall with an inner surface defining a flow chamber extending between the fluid inlet opening and the fluid outlet opening of the cartridge member, and an outer surface defining a pressure chamber between the outer surface of the flexible wall and the cartridge chamber wall, wherein the flexible wall is adapted to constrict upon itself when a fluid force in the pressure chamber is at least equal to the fluid force in the flow chamber to close the flow chamber and prevent fluid flow between the inlet chamber and the outlet chamber.

* * * * *

UNITED STATES PATENT AND TRADEMARK OFFICE
CERTIFICATE OF CORRECTION

PATENT NO. : 6,959,905 B2
DATED : November 1, 2005
INVENTOR(S) : Bush

It is certified that error appears in the above-identified patent and that said Letters Patent is hereby corrected as shown below:

<u>Title page,</u>
Item [73], Assignee, "Shawn D. Bush, Oviedo, FL (US)" should read
-- I-CON Systems, Inc., Oviedo, FL (US) --.

<u>Column 13,</u>
Line 63, "of the of the" should read -- of the --.

Signed and Sealed this

Eighteenth Day of April, 2006

JON W. DUDAS
*Director of the United States Patent and Trademark Office*